United States Patent
Kim et al.

(10) Patent No.: US 9,312,533 B2
(45) Date of Patent: Apr. 12, 2016

(54) MANUFACTURING METHODS OF MATERIALS POWDER FOR PERFORMANCE IMPROVED ELECTRODE AND USING THE SAME ELECTRODE AND ITS APPLICATION

(71) Applicant: KOREA INSTITUTE OF ENERGY RESEARCH, Daejeon (KR)

(72) Inventors: Sun-Dong Kim, Daejeon (KR); Sang-Kuk Woo, Daejeon (KR); Se-Young Kim, Seongnam-si (KR); Jong-Hoon Joo, Chungcheongbuk-do (KR); In-Sub Han, Daejeon (KR); Doo-Won Seo, Daejeon (KR); Min-Soo Suh, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 347 days.

(21) Appl. No.: 13/959,684

(22) Filed: Aug. 5, 2013

(65) Prior Publication Data
US 2014/0299171 A1    Oct. 9, 2014

(30) Foreign Application Priority Data
Apr. 3, 2013    (KR) .................. 10-2013-0036157

(51) Int. Cl.
*H01L 35/02* (2006.01)
*H01M 4/04* (2006.01)
*H01M 10/39* (2006.01)

(52) U.S. Cl.
CPC ............ *H01M 4/0471* (2013.01); *H01M 10/39* (2013.01)

(58) Field of Classification Search
CPC ............................ H01M 4/0471; H01M 10/39

USPC ......... 264/603, 618, 630, 653, 666, 668, 670; 136/230; 427/77
See application file for complete search history.

(56) References Cited

U.S. PATENT DOCUMENTS

| | | | | |
|---|---|---|---|---|
| 5,658,355 | A * | 8/1997 | Cottevieille | H01G 9/155 29/25.03 |
| 6,168,694 | B1 * | 1/2001 | Huang | H01G 9/155 106/287.26 |
| 2001/0000889 | A1 * | 5/2001 | Yadav | B01D 53/32 204/242 |
| 2009/0303660 | A1 * | 12/2009 | Nair | H01G 11/46 361/502 |
| 2011/0014737 | A1 * | 1/2011 | Choung | H01L 27/1214 438/34 |
| 2012/0103828 | A1 * | 5/2012 | Bulan | C25B 11/0484 205/625 |
| 2012/0107719 | A1 * | 5/2012 | Liao | H01M 4/8803 429/482 |
| 2012/0164525 | A1 * | 6/2012 | Endoh | H01M 4/131 429/203 |
| 2012/0220069 | A1 * | 8/2012 | Lin | C23C 18/1208 438/98 |
| 2013/0165313 | A1 * | 6/2013 | Kijima | C01G 23/002 501/135 |
| 2013/0256297 | A1 * | 10/2013 | Nobori | H01L 21/6831 219/544 |

FOREIGN PATENT DOCUMENTS

KR    10-1101704 B    1/2012

* cited by examiner

*Primary Examiner* — Joseph S Del Sole
*Assistant Examiner* — Nahida Sultana
(74) *Attorney, Agent, or Firm* — Revolution IP, PLLC

(57) ABSTRACT

Disclosed is a material for an electrode having an excellent performance and an excellent durability by maintaining high electrical conductivity and by restraining the growth of the grain at a high temperature. The material can be manufactured by synthesizing composite materials through use of a metallic material of Mo and a ceramic material, and then the composite materials can be used as the electrode.

9 Claims, 8 Drawing Sheets

MANUFACTURING METHODS OF MATERIALS POWDER FOR PERFORMANCE IMPROVED ELECTRODE AND USING THE SAME ELECTRODE AND ITS APPLICATION

CROSS REFERENCE TO PRIOR APPLICATIONS

This application claims priority under 35 U.S.C. §119 to Korean Patent Application No. 10-2013-0036157, filed on Apr. 3, 2013, which is hereby incorporated by reference in its entirety.

BACKGROUND

1. Field

The present invention relates to a technology for an electrode material capable of replacing a conventional Mo-based metal electrode material and a conventional ceramic-based electrode material, and more particularly to a technology for synthesizing composite materials by using the Mo and ceramic material and for using them as an electrode.

2. Description of Related Art

Alkali Metal Thermal to Electric Converter (AMTEC) is a thermal to electric power generator capable of generating electrical energy from thermal energy.

When a temperature difference is given to both ends of an ionically conductive Beta-Alumina Solid Electrolyte (BASE), Na charged in the cell is ionized into Na+ due to the vapor pressure difference of Na, and then is neutralized. Electricity is generated during this process.

In this case, low voltage and high current are generated. So, when the cells are modularized by being connected in series or in parallel, a large amount of electric power can be generated.

The development of alkali metal thermal to electric converter (AMTEC) technology has started for the purpose of an electric power source for space.

The AMTEC has a high power density per unit area and high efficiency, and maintains stability. The AMTEC uses a variety of heat sources, for example, solar energy, fossil fuel, waste heat, terrestrial heat, nuclear reactor, etc. The AMTEC is comprised of electric power generation cells capable of generating electricity without using a driver such as a turbine, a motor or the like, so that it can directly generate electricity from a portion contacting with the heat. When the AMTEC is formed in the form of a module in series or in parallel, a great amount of electricity of several KW to several hundredths MW can be generated.

At present, through a technology of collecting the waste heat, the waste heat is collected in the form of heat water, combustion air, etc., by using a heat exchanger, a waste heat boiler or the like.

The AMTEC is capable of improving the efficiency by directly generating high-quality electricity. Therefore, the AMTEC is now issued as a promising technology replacing the existing technologies.

One of the characteristics of the AMTEC power generation technology is to have a simpler structure and higher energy conversion efficiency than those of other thermal to electric converting elements.

Particularly, compared with a solar thermal power plant, the AMTEC power generation technology does not require a mechanical driver such as a turbine, etc. Compared with a thermoelectric device, the AMTEC power generation technology can be applied to a high capacity, a high efficiency system.

The process of generating electricity in the AMTEC will be specifically described. After the state of Na vapor is changed into a vapor state in a high temperature and high pressure evaporator by a heat source, Na+ passes through beta-alumina solid electrolyte (BASE), and free electrons return to a cathode through an electric load from an anode, and then are recombined with ion generated from the surface of a low temperature and low pressure BETA and then is neutralized. Electricity is generated during this process.

The vapor pressure of Na plays the most significant role in a thermal to electric power generator as an energy source or a driving force which generates electricity. Also, free electrons generated during a process in which Na passes through the solid electrolyte due to a concentration difference and temperature difference of a working fluid are collected through electrodes, so that electricity can be generated.

The beta-alumina and Na super-ionic conductor (NASICON) may be used as the solid electrolyte.

However, when NASICON is exposed at a high temperature for a long time, there is a problem in the stability thereof.

The beta-alumina includes two kinds of beta'-alumina and beta"-alumina.

The beta'-alumina has a more improved layer structure so that the conductivity of the Na+ ion is much better. Therefore, the beta"-alumina is now generally used.

A process is repeated in which the neutral Na vapor is condensed by being cooled on the inner surface of a low pressure condenser and is transferred to an evaporator by a capillary wick, and then is changed into a vapor state again. Generally, the temperature of the evaporator is in a range of 900 K to 1,100 K, and the temperature of the condenser in a range of 500 K to 600 K.

It is possible for the efficiency of the thermal to electric power generation of the AMTEC to be up to 40%. The AMTEC power generation technology has a high power density and a simple structure requiring no separate driver.

It is Mo-based metal electrode material and a ceramic-based electrode material like TiN, TiC, NbC, RuW, $Ru_2O$, etc., that have been researched up to now and used in the AMTEC.

In Korean Patent No. 10-1101704, disclosed is an electrode for a thermoelectric device and a method for manufacturing the same. More specifically, the method includes: weighing Ni powder and Mo powder in such a manner as to form a composition of $Ni_{1-x}Mo_X$ (Here, 0.5≤X<1 and X is a real number), mixing the weighed Ni powder and the weighed Mo powder in such a manner as to form the composition of $Ni_{1-x}Mo_X$ (Here, 0.5≤X<1 and X is a real number), filling the mixed powder of the Ni powder and the Mo powder in a mold and setting in a chamber of a spark plasma sintering system, reducing the pressure of the inside of the chamber through the vacuumization and performing spark plasma sintering on the mixed powder by applying a DC pulse while pressurizing the mixed powder, obtaining a $Ni_{1-x}Mo_X$ sintered body (Here, 0.5≤X<1 and X is a real number) by cooling the temperature of the chamber. According to the present invention, since the temperature can be rapidly increased, it is possible to restrain grains from growing, to obtain a dense sintered body for a short time, to obtain a high dense electrode for a thermoelectric device, which can be sintered for a short time and has few pores and grains having a very dense gap therebetween. Since the electrode for a thermoelectric device has a much less thermal expansion coefficient difference from a thermoelectric semiconductor, $CoSb_3$ than those of other electrode materials, it has less mismatch, for example, excitation at the interface with the thermoelectric semiconductor even at a high temperature, so that the reliability of the electrode for a thermoelectric device is high at a high temperature. However, there is still a requirement for an electrode having an excellent performance and an excellent durability by maintaining high electrical conductivity and by restraining the growth of the grain at a high temperature.

SUMMARY

It is a Mo-based metal electrode material, a ceramic-based electrode material such as TiN, TiC, NbC, RuW and $Ru_2O$, etc., and a metal electrode such as Ni, Al and the like that have been researched and used as an electrode material for AMTEC.

While it is known that the Mo-based metal electrode has the most excellent performance, the performance of the Mo-based metal electrode is degraded by a degradation process due to the growth of the metal electrode grain under a high temperature operating condition.

In order to overcome the aforementioned problem of the Mo-based metal electrode, an attempt has been made to restrain the performance degradation, i.e., the growth of the metal electrode grain by using the ceramic-based electrode material, for example, TiN, TiC, NbC, RuW, $Ru_2O$, etc., instead of the metallic Mo-based material. However, the performance of the ceramic-based electrode material is less than that of the metal Mo electrode.

As such, regarding the AMTEC electrode, research has been simultaneously devoted to both a method of maintaining the high performance by using the metal Mo grain and to the acquisition of the long-term stability by using the ceramic-based electrode material such as TiN, TiC, NbC, RuW and $Ru_2O$. However, due to the low electrical conductivity of the ceramic electrode, etc., a material capable of meeting both the performance and durability has not been developed yet.

An aspect of the present invention is a material for an electrode having an excellent performance and an excellent durability by maintaining high electrical conductivity and by restraining the growth of the grain at a high temperature. The material can be manufactured by synthesizing composite materials through use of a metallic material of Mo and a ceramic material, and then the composite materials can be used as the electrode.

For this, the manufacture of the material includes forming a Mo organic complex mixed with a ceramic slurry through a plurality of heat treatment processes, and forming composite powder including Mo and ceramic through a calcining process.

An electrode manufactured by using the mixed powder which is a composite material according to the present invention and includes the Mo and ceramic has dual and complex characteristics of the ceramic and metal.

Therefore, the electrode of the present invention has not only the advantage of the Mo-based metal electrode, that is, excellent electrical conductivity at a high temperature but also the advantage of the ceramic based electrode, that is, restraint of the grain growth at a high temperature. As a result, the performance is not degraded at a high temperature.

Also, even though the electrode is formed through the two different compositions of the Mo and ceramic, an uniform fine structure is obtained by the synthesis.

Besides, thanks to the heterogeneous sintering of the Mo and ceramic, three phase boundary (TPB) in which pores are naturally formed, in which high porosity is maintained even at a high temperature and in which an electrode reaction occurs is maximized.

Through the electrode manufactured by using the mixed powder which is a composite material according to the present invention and includes the Mo and ceramic, it is possible to overcome delamination caused by the difficulty in performing ceramic (electrolyte)-metal (electrode) heterogeneous sintering when a pure metal Mo electrode is molded on Beta-Alumina Solid Electrolyte (BASE) and sintered. Accordingly, the electrode shows intermediate properties between metal and ceramic, so that interface bonding is also improved.

DETAILED DESCRIPTION

Figure 1:
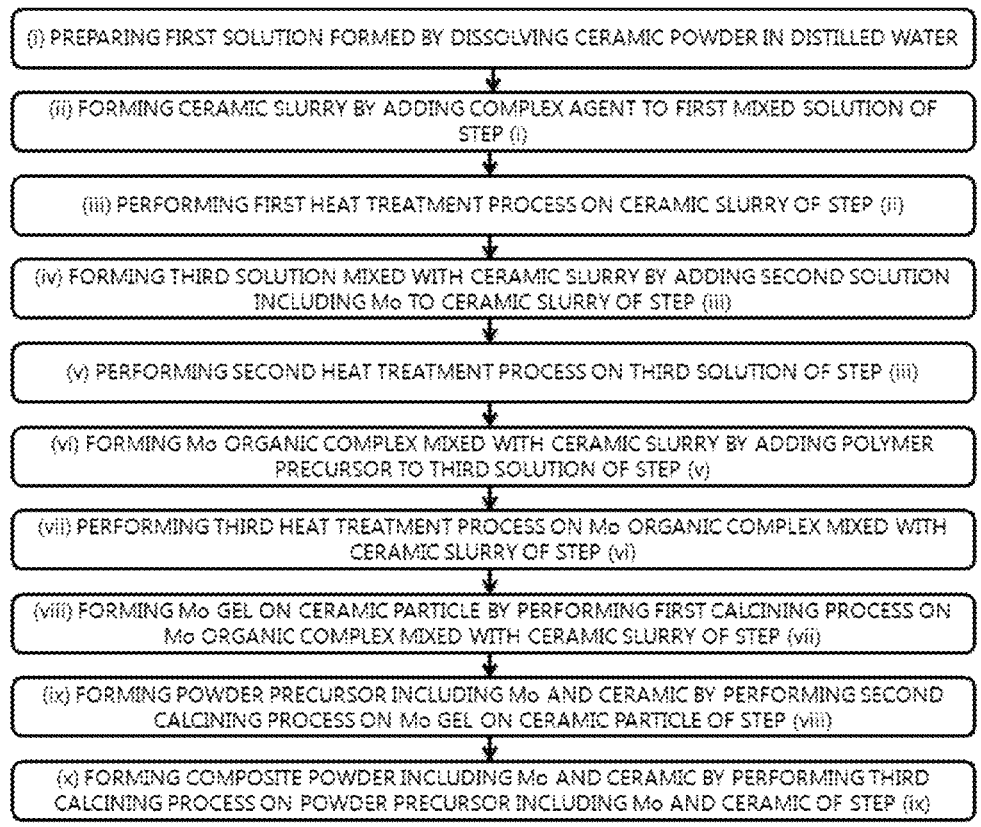
FIG. 1 shows a method for manufacturing powder for an electrode material in accordance with the present invention.

FIG. 1 shows a method for manufacturing powder for an electrode material in accordance with the present invention. The method includes: (i) preparing a first solution formed by dissolving ceramic powder in distilled water, (ii) forming ceramic slurry by adding a complex agent to the first mixed solution of step (i), (iii) performing a first heat treatment process on the ceramic slurry of step (ii), (iv) forming a third solution mixed with the ceramic slurry by adding a second solution including Mo to the ceramic slurry of step (iii), (v) performing a second heat treatment process on the third solution of step (iii), (vi) forming a Mo organic complex mixed with the ceramic slurry by adding polymer precursor to the third solution of step (v), (vii) performing a third heat treatment process on the Mo organic complex mixed with the ceramic slurry of step (vi), (viii) forming Mo gel on the ceramic particle by performing a first calcining process on the Mo organic complex mixed with the ceramic slurry of step (vii), (ix) forming powder precursor including Mo and ceramic by performing a second calcining process on the Mo gel on the ceramic particle of step (viii), and (x) forming composite powder including Mo and ceramic by performing a third calcining process on the powder precursor including Mo and ceramic of step (ix).

In step (i), it is preferable that the ceramic powder should include at least any one of TiN, TiC, NbC, RuW and $Ru_2O$.

It is the most preferable to select TiN.

In step (ii), the complex agent may include at least any one of ethylene diamine tetraacetic acid (EDTA), citric acid, acetic acid, butyric acid, palmitic acid, oxalic acid, tartaric acid. It is the most preferable to select the ethylene diamine tetraacetic acid (EDTA).

In step (iv), the second solution including Mo may include at least one of ammonium molybdate, sodium molybdate and molybdenum nitride. It is the most preferable to select ammonia molybdate $((NH_4)_6Mo_7O_{24}?4H_2O)$.

In step (vi), in the polymeric precursor, distilled water is used as a solvent. The polymeric precursor may include at least one of ethylene glycol, glycerine, propylene glycol and butylene glycol. It is the most preferable to select the ethylene glycol.

It is preferable that the heat treatment processes in steps (iii), (v) and (vii) should be performed at a temperature from 60 to 100° C. for 10 to 50 minutes.

It is the most preferable that the heat treatment processes in steps (iii), (v) and (vii) should be performed at a temperature from 75 to 85° C. for 25 to 35 minutes.

The first calcining process of step (viii) may be performed at a temperature from 150 to 210° C. for 1 to 3 hours in the air.

It is the most preferable that the first calcining process of step (viii) should be performed at a temperature from 170 to 190° C. for 2 hours.

The second calcining process of step (ix) may be performed at a temperature from 400 to 600° C. for 2 to 4 hours in the air.

It is the most preferable that the second calcining process of step (ix) should be performed at a temperature from 450 to 550° C. for 3 hours.

It is preferable that the third calcining process of step (x) should be performed at a temperature from 700 to 1100° C. for 5 to 7 hours in a hydrogen atmosphere.

It is the most preferable that the third calcining process of step (x) should be performed at a temperature from 850 to 950° C. for 6 hours.

The above-mentioned method for manufacturing the powder for an electrode material is included in one embodiment of the present invention. Therefore, the method is not limited to this and may be variously applied according to the changes of the conditions.

In an electrode manufactured by the method for manufacturing the powder for an electrode material in accordance with the present invention, the growth rate of the grain within the electrode at a high temperature may be less than 50% of the size of an initial grain of an electrode manufactured with Mo, and the electrical conductivity of the electrode may be 50% to 90% of the electrical conductivity of the electrode manufactured with Mo.

A method for manufacturing a thermal to electric converting cell 100 may include: manufacturing a tubular metal support 110 formed of a metallic material; forming an internal electrode 120, which has been manufactured in accordance with the powder for an electrode material in accordance with the present invention, on the surface of the metal support 110; forming a solid electrolyte 130 on the surface of the internal electrode 120; and forming an external electrode 140, which has been manufactured with the powder for an electrode material in accordance with the present invention, on the surface of the solid electrolyte 130.

The metal support 110 is a porous metal support. The metal support 110 may include at least any one of Mo, Ti, W, Cu, Ni, Fe, Ni—Fe, stainless and bronze.

The solid electrolyte 130 may include at least any one of a beta-alumina solid electrolyte and a Na super-ionic conductor (NASICON) solid electrolyte.

Figure 7:
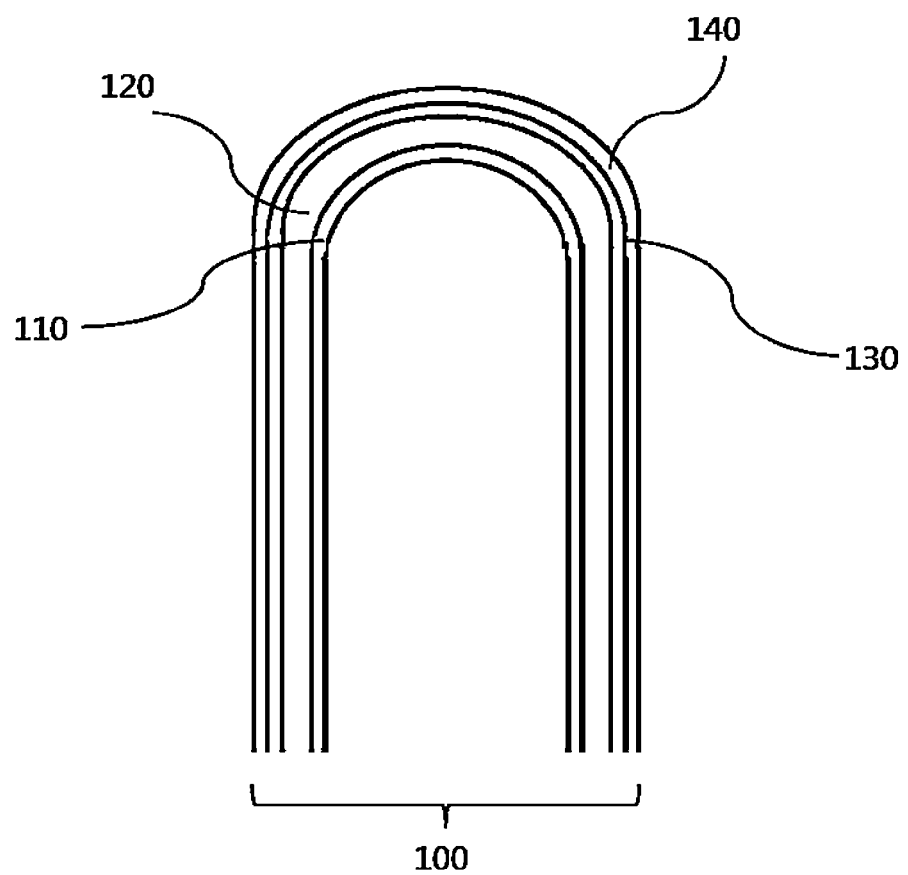
FIG. 7 is a cross sectional view of a metal support thermal to electric converting cell according to the present invention.

FIG. 7 is a cross sectional view of a metal support thermal to electric converting cell according to the present invention.

The thermal to electric converting cell 100 which has been manufactured by the aforementioned method may include the tubular metal support 110, the internal electrode 120 formed on the surface of the metal support 110 by using the powder for an electrode material in accordance with the present invention, the solid electrolyte 130 formed on the surface of the internal electrode 120, and external electrode 140 formed on the surface of the solid electrolyte 130 by using the powder for an electrode material in accordance with the present invention.

Figure 8:
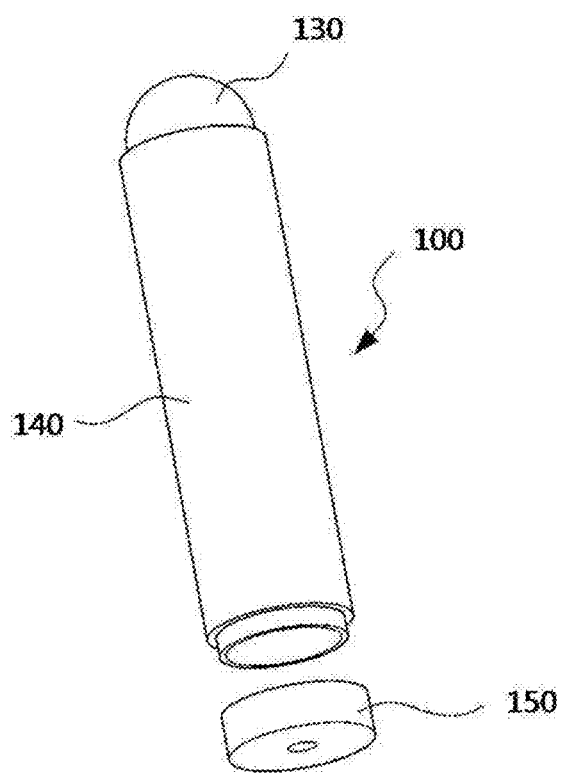
FIG. 8 shows that the metal support thermal to electric converting cell has been joined to the insulation layer in accordance with the present invention.

FIG. 8 shows that the metal support thermal to electric converting cell has been joined to an insulation layer 150 in accordance with the present invention.

Embodiment 1

Figure 2:
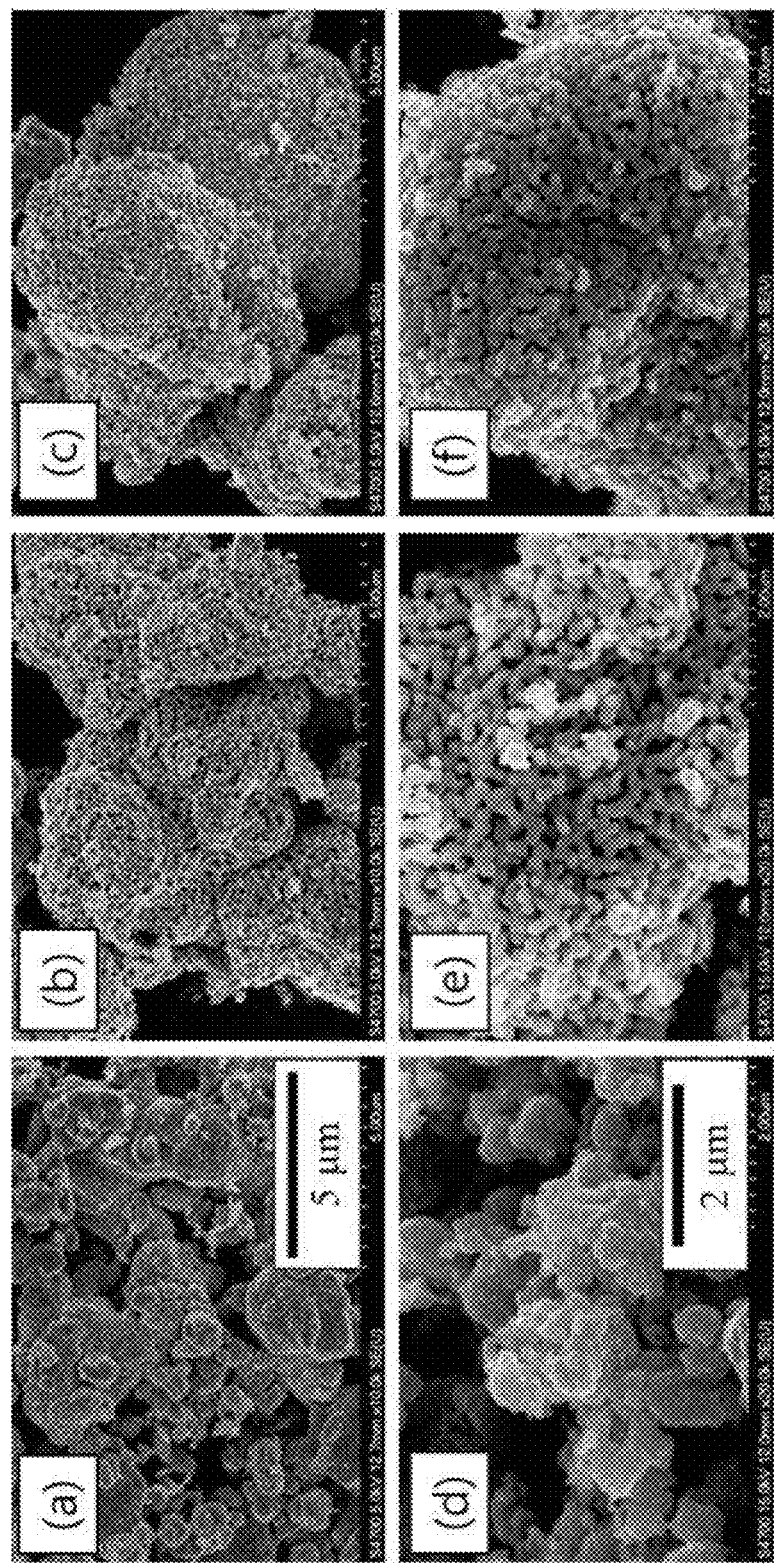
FIG. 2a-2f show, step by step, scanning electron microscope (SEM) images of composite powder which is manufactured by the method for manufacturing the powder for an electrode material in accordance with the present invention and includes Mo and ceramic.

FIG. 2 shows, step by step, scanning electron microscope (SEM) images of composite powder which is manufactured by the method for manufacturing the powder for an electrode material in accordance with the present invention and includes Mo and ceramic.

In the embodiment 1, the composite powder is manufactured by using Mo and TiN.

An image (×10 k) calcined in the air at a temperature of 500° C. is shown in (a) of FIG. 2.

An image (×10 k) reduced in the air at a temperature of 600° C. in a hydrogen atmosphere after step (a) is shown in (b) of FIG. 2.

An image (×10 k) reduced in the air at a temperature of 900° C. in a hydrogen atmosphere after step (a) is shown in (c) of FIG. 2.

An image (×50 k) obtained by enlarging the image of (a) is shown in (d) of FIG. 2.

An image (×50 k) obtained by enlarging the image of (b) is shown in (e) of FIG. 2.

An image (×50 k) obtained by enlarging the image of (c) is shown in (f) of FIG. 2.

These show that the electrode manufactured with the powder for an electrode material according to the present invention obtains a uniform fine structure.

Embodiment 2

Figure 3:
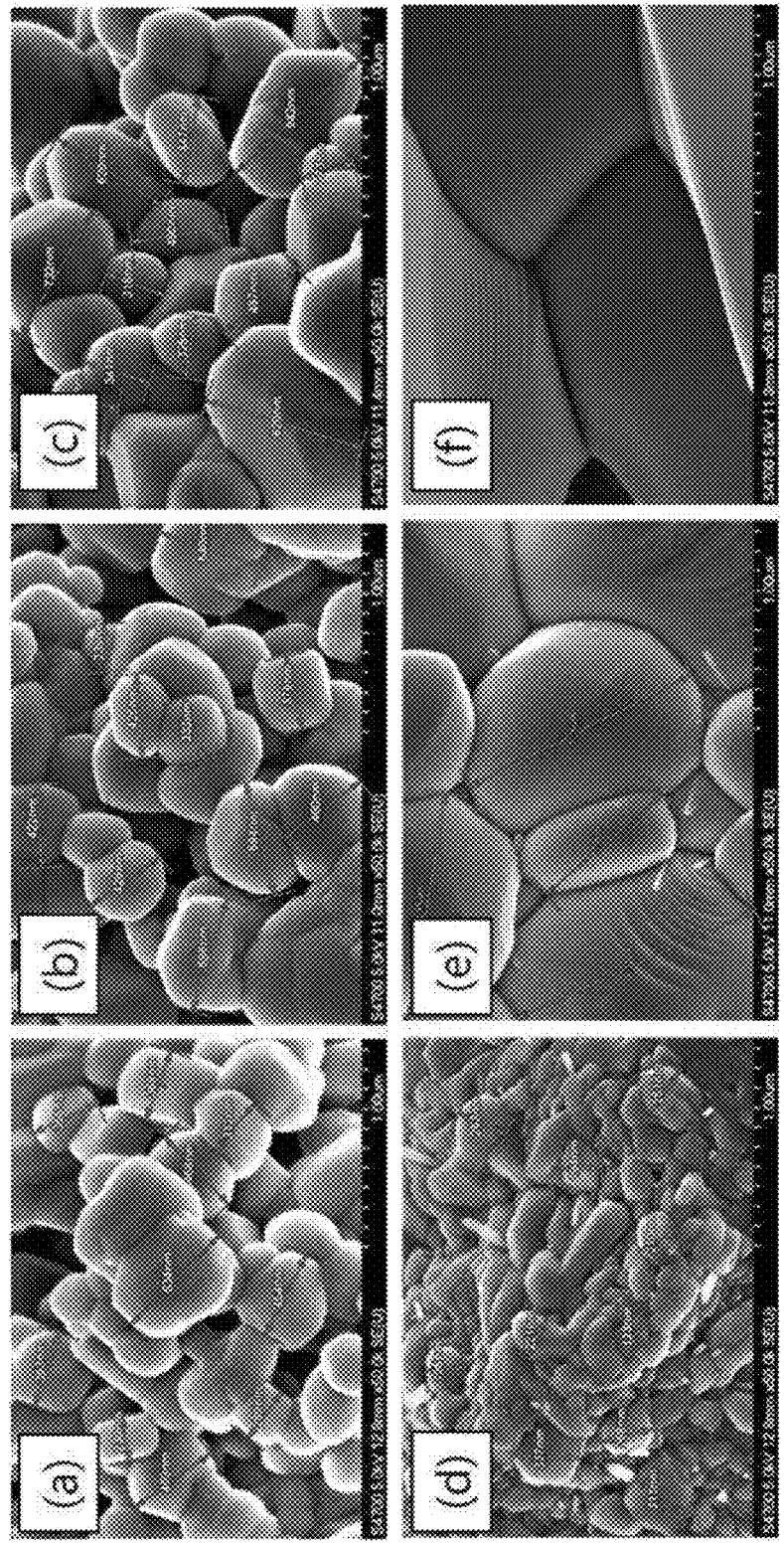
FIG. 3a-3f show, in accordance with thermal cycling steps, scanning electron microscope (SEM) images of the sizes of Mo grains of an electrode manufactured with the powder for an electrode material of the present invention and shows, in accordance with the thermal cycling steps, scanning electron microscope (SEM) images of the sizes of Mo grains of an electrode manufactured with conventional Mo.

FIG. 3 shows, in accordance with thermal cycling steps, scanning electron microscope (SEM) images of the sizes of Mo grains of an electrode manufactured with the powder for an electrode material of the present invention and shows, in accordance with the thermal cycling steps, scanning electron microscope (SEM) images of the sizes of Mo grains of an electrode manufactured with conventional Mo.

In the thermal cycling, one thermal cycling step includes a temperature variation from a normal temperature to 800° C.

In the embodiment 2, the composite powder is manufactured by using Mo and TiN.

An initial image of grains of the electrode manufactured with the composite powder manufactured by using Mo and TiN is shown in (a) of FIG. 3.

An initial image of the grains of the electrode manufactured with the composite powder manufactured by using Mo and TiN after the third heat treatment process is shown in (b) of FIG. 3.

An initial image of the grain of the electrode manufactured with the composite powder manufactured by using Mo and TiN after a fifth heat treatment process is shown in (c) of FIG. 3.

An initial image of the grain of a Mo metal electrode is shown in (d) of FIG. 3.

The image of the grain of a Mo metal electrode after the third heat treatment process is shown in (e) of FIG. 3.

The image of the grain of a Mo metal electrode after the fifth heat treatment process is shown in (f) of FIG. 3.

In comparison with the grain growth of the Mo metal electrode at a high temperature, these show that the electrode manufactured with the powder for an electrode material according to the present invention restrains the grain growth, and then causes no performance degradation.

Embodiment 3

Figure 4:
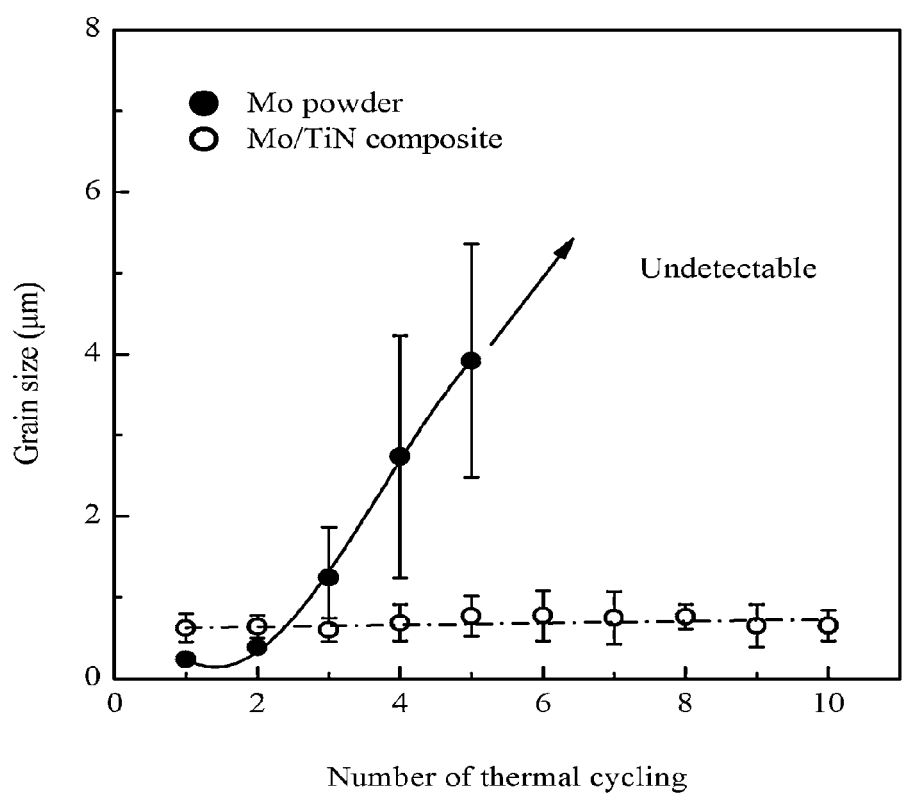
FIG. 4 shows, in accordance the with thermal cycling steps, graphs of the sizes of grains of an electrode manufactured with the powder for an electrode material of the present invention and shows, in accordance the with thermal cycling steps, graphs of the sizes of Mo grains of the electrode manufactured with the conventional Mo.

FIG. 4 shows, in accordance the with thermal cycling steps, graphs of the sizes of grains of an electrode manufactured with the powder for an electrode material of the present invention and shows, in accordance the with thermal cycling steps, graphs of the sizes of Mo grains of the electrode manufactured with the conventional Mo.

In the thermal cycling, one thermal cycling step includes a temperature variation from a normal temperature to 800° C.

In the embodiment 3, the composite powder is manufactured by using Mo and TiN.

It can be found that while the size of the Mo grain of the electrode manufactured with Mo grows to 4 μm after a fifth thermal cycling step, the grain size of the electrode manufactured with the composite powder by using Mo and TiN in accordance with the present invention is maintained 1 μm, i.e., the initial value after the fifth thermal cycling step.

In comparison with the grain growth of the Mo metal electrode at a high temperature, these show that the electrode manufactured with the powder for an electrode material according to the present invention restrains the grain growth, and then causes no performance degradation.

Embodiment 4

Figure 5:
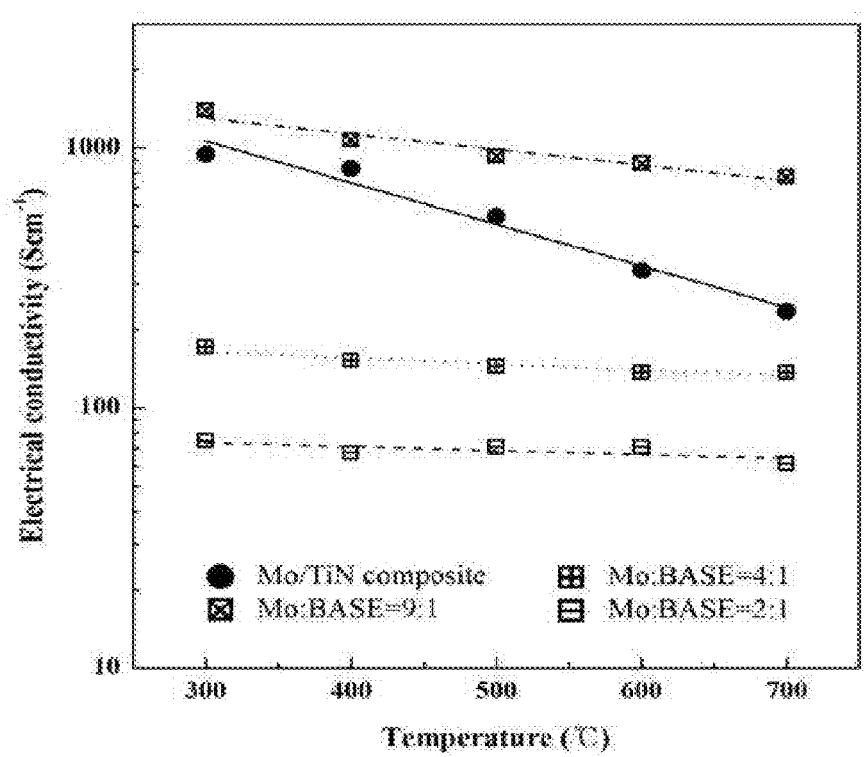
FIG. 5 shows electrical conductivity of the electrode manufactured with the powder for an electrode material according to the present invention and shows electrical conductivity of an electrode manufactured by mixing conventional Mo and Beta-Alumina Solid Electrolyte (BASE)

FIG. 5 shows electrical conductivity of the electrode manufactured with the powder for an electrode material according to the present invention and shows electrical conductivity of an electrode manufactured by mixing conventional Mo and Beta-Alumina Solid Electrolyte (BASE).

In the embodiment 4, the composite powder is manufactured by using Mo and TiN. When only the Mo electrode is molded on Beta-Alumina Solid Electrolyte (BASE) and sintered, delamination occurs. Therefore, Mo and BASE are mixed in metal-powder ratios of 9:1, 4:1 and 2:1, and then electrical conductivity is measured. As a result, when Mo and BASE are mixed in the ratio of 9:1, the highest electrical conductivity is obtained while the delamination occurs after the measurement. When Mo and BASE are mixed in the ratios of 2:1 and 4:1, the delamination is reduced while the electrical conductivity becomes less.

Contrarily, the electrode manufactured with the composite powder by using Mo and TiN in accordance with the present invention maintains high conductivity without delamination.

This shows that the electrode manufactured with the powder for an electrode material according to the present invention has conductivity equal to or greater than the excellent conductivity, i.e., an advantage of the Mo-based metal electrode at a high temperature.

Embodiment 5

Figure 6:
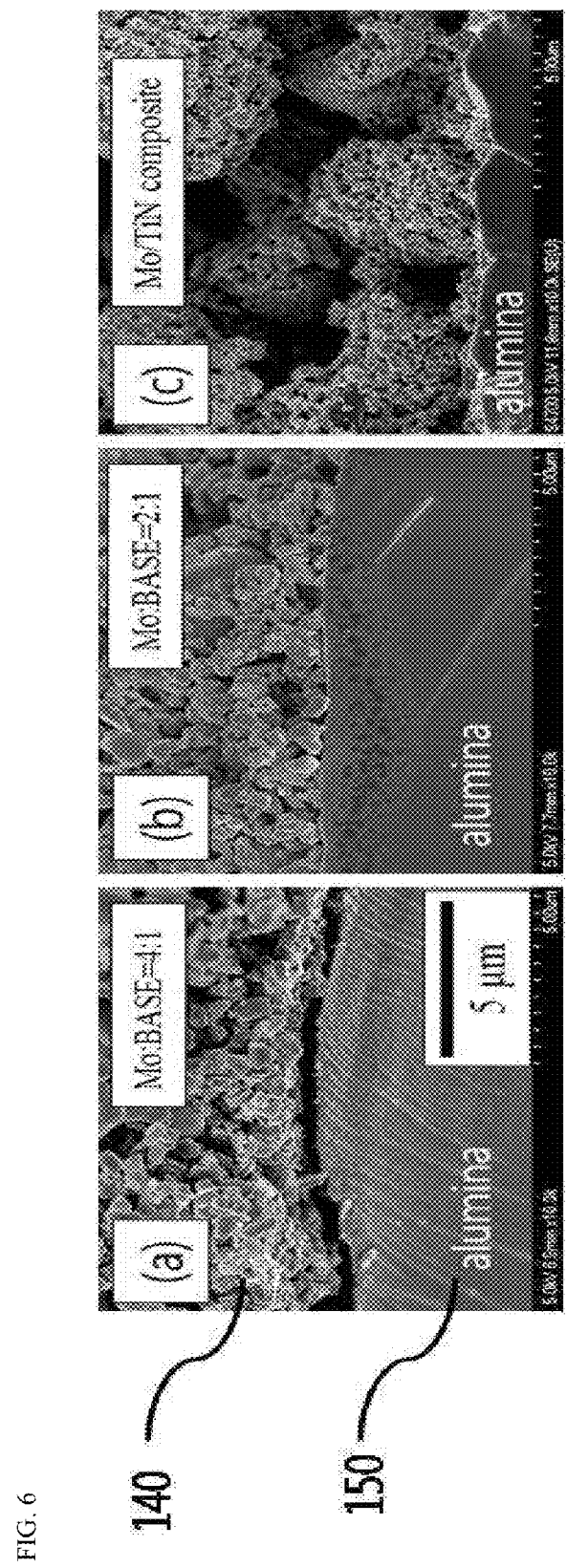
FIG. 6a-6c show scanning electron microscope (SEM) images of the electrode manufactured with the powder for an electrode material according to the present invention, of the electrode manufactured by mixing conventional Mo and Beta-Alumina Solid Electrolyte (BASE), and of a joiner of an alumina insulation layer.

FIG. 6 shows scanning electron microscope (SEM) images of the electrode manufactured with the powder for an electrode material according to the present invention, of the electrode manufactured by mixing conventional Mo and Beta-Alumina Solid Electrolyte (BASE), and of a joiner of an alumina insulation layer.

In the embodiment 5, the composite powder is manufactured by using Mo and TiN.

The joiner of the Mo metal electrode (Mo:BASE=4:1 wt %) is shown in (a) of FIG. 6.

The joiner of the Mo metal electrode (Mo:BASE=2:1 wt %) is shown in (b) of FIG. 6.

The joiner of the electrode manufactured with the composite powder by using Mo and TiN in accordance with the present invention is shown in (c) of FIG. 6.

Through the electrode manufactured by using the mixed powder which is a composite material according to the present invention and includes the Mo and ceramic, it is possible to overcome the delamination caused by the difficulty in performing ceramic (electrolyte)-metal (electrode) heterogeneous sintering when a pure metal Mo electrode is molded on the Beta-Alumina Solid Electrolyte (BASE) and sintered. Accordingly, the electrode shows intermediate properties between metal and ceramic, so that interface bonding is also improved.

The present invention has been described with reference to the accompanying drawings. This is just one of various embodiments including the subject matter of the present invention and intends to allow those skilled in the art to easily embody the present invention. It is clear that the present invention is not limited to the above-described embodiments. Therefore, the scope of the present invention should be construed by the following claims. Without departing from the subject matter of the present invention, all the technical spirits within the scope equivalent to the subject matter of the present invention is included in the right scope of the present invention by the modifications, substitutions, changes and the like. Also, it is clear that some of the drawing configuration are intended for more clearly describing the configuration and are more exaggerated or shortened than the actual one.

What is claimed is:

1. A method for manufacturing powder for an electrode material, the method comprising:
   (i) preparing a first solution formed by dissolving ceramic powder in distilled water;
   (ii) forming ceramic slurry by adding a complex agent to the first mixed solution of step (i);
   (iii) performing a first heat treatment process on the ceramic slurry of step (ii);
   (iv) forming a third solution mixed with the ceramic slurry by adding a second solution including Mo to the ceramic slurry of step (iii);
   (v) performing a second heat treatment process on the third solution of step (iii);

(vi) forming a Mo organic complex mixed with the ceramic slurry by adding polymer precursor to the third solution of step (v);

(vii) performing a third heat treatment process on the Mo organic complex mixed with the ceramic slurry of step (vi);

(viii) forming Mo gel on the ceramic particle by performing a first calcining process on the Mo organic complex mixed with the ceramic slurry of step (vii);

(ix) forming powder precursor including Mo and ceramic by performing a second calcining process on the Mo gel on the ceramic particle of step (viii); and (x) forming composite powder including Mo and ceramic by performing a third calcining process on the powder precursor including Mo and ceramic of step (ix).

2. The method of claim 1, wherein, in step (i), the ceramic powder comprises at least any one of TiN, TiC, NbC, RuW and $Ru_2O$.

3. The method of claim 1, wherein, in step (ii), the complex agent comprises at least any one of ethylene diamine tetraacetic acid (EDTA), citric acid, acetic acid, butyric acid, palmitic acid, oxalic acid, tartaric acid.

4. The method of claim 1, wherein, in step (iv), the second solution including Mo comprises at least one of ammonium molybdate, sodium molybdate and molybdenum nitride.

5. The method of claim 1, wherein, in step (vi), the polymeric precursor uses distilled water as a solvent and comprises at least one of ethylene glycol, glycerine, propylene glycol and butylene glycol.

6. The method of claim 1, wherein the heat treatment processes in steps (iii), (v) and (vii) are performed at a temperature from 60 to 100° C. for 10 to 50 minutes.

7. The method of claim 1, wherein the first calcining process of step (viii) is performed at a temperature from 150 to 210° C. for 1 to 3 hours in the air.

8. The method of claim 1, wherein the second calcining process of step (ix) is performed at a temperature from 400 to 600° C. for 2 to 4 hours in the air.

9. The method of claim 1, wherein the third calcining process of step (x) is performed at a temperature from 700 to 1100° C. for 5 to 7 hours in a hydrogen atmosphere.

* * * * *